US011124171B2

(12) United States Patent
Braatz et al.

(10) Patent No.: US 11,124,171 B2
(45) Date of Patent: Sep. 21, 2021

(54) SYSTEMS AND METHODS FOR MAKING A MODULAR RAILROAD RETARDER CONTROL SYSTEM

(71) Applicant: Precision Rail and Mfg., Inc., Oak Creek, WI (US)

(72) Inventors: James D. Braatz, Greenfield, WI (US); Richard E. Futter, Jr., Mequon, WI (US)

(73) Assignee: Precision Rail and Mfg., Inc., Oak Creek, WI (US)

( * ) Notice: Subject to any disclaimer, the term of this patent is extended or adjusted under 35 U.S.C. 154(b) by 52 days.

(21) Appl. No.: 16/552,417

(22) Filed: Aug. 27, 2019

(65) Prior Publication Data
US 2020/0070796 A1 Mar. 5, 2020

Related U.S. Application Data (60) Provisional application No. 62/723,673, filed on Aug. 28, 2018.

(51) Int. Cl.
*B60T 15/02* (2006.01)
*B61H 13/34* (2006.01)
*F16K 11/22* (2006.01)
*F16K 27/00* (2006.01)

(52) U.S. Cl.
CPC ............ *B60T 15/021* (2013.01); *B61H 13/34* (2013.01); *F16K 11/22* (2013.01); *F16K 27/003* (2013.01)

(58) Field of Classification Search
CPC ....... B61H 13/34; B60T 15/021; F16K 11/22; Y10T 137/6011
See application file for complete search history.

(56) References Cited

U.S. PATENT DOCUMENTS

| 3,863,739 | A | * | 2/1975 | Schaefer | F16H 47/08 188/296 |
| 3,978,666 | A | * | 9/1976 | Kelly | E02F 9/2253 60/327 |
| 4,393,960 | A | | 7/1983 | Mazur et al. | |
| 4,898,206 | A | * | 2/1990 | Meistrick | F01L 13/065 137/494 |
| 5,787,859 | A | * | 8/1998 | Meistrick | F01L 13/065 123/321 |
| 5,809,964 | A | * | 9/1998 | Meistrick | F01L 13/065 123/321 |

(Continued)

Primary Examiner — Kevin R Barss
(74) Attorney, Agent, or Firm — Andrus Intellecutal Property Law, LLP (57) ABSTRACT

A cartridge assembly for a railroad retarder control system. The cartridge assembly includes a body having a top and a valve base and defining a bore. The bore has first and second bore diameters, and the body defines pilot air passages, an upper air passage, and a lower air passage. A traveling member is positioned within the bore and has first and second traveling diameters corresponding to the first and second bore diameters of the body, respectively. The traveling member is axially moveable within the bore between open and closed positions via pressure differentials within the pilot air passages. The traveling member is closer to the top of the body in the open position than in the closed position. The traveling member has a base seal configured to engage with the valve base in the closed position to prevent air from flowing between the upper and lower air passages.

20 Claims, 10 Drawing Sheets

(56) References Cited

U.S. PATENT DOCUMENTS

| | | | |
|---|---|---|---|
| 7,140,698 B2 | 11/2006 | Braatz et al. | |
| 7,306,077 B2 | 12/2007 | Heyden et al. | |
| 7,325,567 B2 * | 2/2008 | Heyden | B61K 7/08 |
| | | | 137/271 |
| 7,392,887 B2 * | 7/2008 | Heyden | B61K 7/08 |
| | | | 188/170 |
| 7,530,432 B2 | 5/2009 | Heyden | |
| 8,499,900 B1 | 8/2013 | Heyden et al. | |
| 9,732,876 B2 * | 8/2017 | Johnson | F16K 31/1223 |
| 9,862,368 B2 * | 1/2018 | Majeskie | B60T 13/686 |
| 2008/0237511 A1 | 10/2008 | Heyden et al. | |

* cited by examiner

SYSTEMS AND METHODS FOR MAKING A MODULAR RAILROAD RETARDER CONTROL SYSTEM

CROSS REFERENCE TO RELATED APPLICATIONS

This application claims the benefit of U.S. Provisional Patent Application No. 62/723,673, filed Aug. 28, 2018, which is incorporated herein by reference in its entirety.

FIELD

The present disclosure generally relates to systems and methods for making a modular railroad retarder control system, and more particularly to systems and methods for making a modular railroad retarder control system, specifically through the newly developed cartridge and modular and manifold body disclosed herein.

BACKGROUND

The Background and Summary are provided to introduce a foundation and selection of concepts that are further described below in the Detailed Description. The Background and Summary are not intended to identify key or essential features of the claimed subject matter, nor are they intended to be used as an aid in limiting the scope of the claimed subject matter.

The following U.S. Patents and Patent Applications are incorporated herein by reference:

U.S. Pat. No. 4,393,960 discloses a brake shoe structure including a series of alternating long brake shoes and short brake shoes mountable on adjacent brake beams in a railroad car retarder. The length of the long brake shoe is such that the long brake shoe symmetrically straddles two adjacent brake beams. The length of the short brake shoe is such that the shoe occupies the spacing on the brake beams between two long brake shoes. The long brake shoes are affixable to each of the brake beams at at least two points. The brake shoes contain a plurality of slanting slots in their braking surfaces for interrupting harmonics producing screeching noises during retardation. The brake shoes may be formed of steel or heat treatable ductile iron.

U.S. Pat. No. 7,140,698 discloses a hydraulic control and operating system provided for a railroad car retarder to control the movement of railroad cars in railroad classification yard. The system utilizes a double-acting hydraulic cylinder to operate the retarder mechanism and includes a hydraulic control circuit that provides protection against pressure spikes and high pressure excursions, high and low temperature excursions, low oil levels and oil filter fouling. The above system not only shuts itself down to prevent damage, but provides a warning to maintenance staff that service should be performed long before a need for system shut-down is required. The system includes a central operating panel in the rail yard control center, remote control panel located at the position of the retarder and the system can be connected for operation from a completely remote location.

U.S. Pat. No. 7,306,077 discloses a fail-safe skate retarder that applies a braking force proportional to the weight of a rail car entering the retarder. Each segment of the retarder includes a lever mechanism with a pair of levers rotatably joined under the running rail. Each lever holds a braking rail for engaging a wheel of the car. The retarder is normally in a lower, fail-safe position with the brake rails closer together than the width of the wheel. When the car enters the retarder, the wheel forces the brake rails apart into a braking position, and the middle of the lever mechanism rises to lift the running rail and car. A hydraulic power unit and cylinder is activated to raise the middle of the lever mechanism even further to a release position so that the brake rails are spread apart more than the width of the wheel.

U.S. Pat. No. 7,530,432 discloses an air bladder actuated railroad car retarder designed to simplify installation, operate in a manner imposing minimal stress on the bladder, improve preventive maintenance, and simplify access to the main fulcrum bearings. The air bladder actuator is made with lightweight aluminum end plates and utilizes a unique stud assembly for attaching the actuator to the retarder pivot arms. Rigid mounting of the air bladder with a unique pivot geometry exposes the bladder to minimal lateral deflection which is balanced in both directions. A simple stroke limiter assembly, external to the air bladder, is also used to measure and monitor wear of the main fulcrum bearings. The stroke limiter assembly is easily demountable and removable to enhance access to the main fulcrum pivot for replacement of the fulcrum bearings.

U.S. Pat. No. 8,499,900 discloses a retarder for controlling the speed of a railcar. The retarder includes a brake and a brake actuator that includes a hydraulic piston-cylinder and a spring. One of the piston and the cylinder acts on the brake and the other of the piston and the cylinder acts on one end of the spring. The other end of the spring acts on the brake. In this arrangement, supplying pressurized hydraulic fluid to the piston-cylinder causes both the piston-cylinder and the spring to move the brake towards a closed position in which the brake will apply braking pressure on the wheel of the railcar. The spring resiliently biases the brake into the closed position to maintain a substantially constant braking pressure on the wheel of the railcar as it moves through the retarder.

U.S. Patent Application Publication No. 2008/0237511 discloses an electro-pneumatic retarder control (EPRC) valve for a pneumatic retarder that controls the speed of railroad cars in a marshaling yard. The EPRC valve has a housing that generally encloses and protects its various components. The housing has a lid that can be opened to gain access to a control panel mounted on an interior door. The control panel includes a display, keyboard and programmable logic controller or PLC module that can be adjusted to set the desired pressure levels of the retarder. The EPRC valve has a modular pressure control assembly that includes an intake and exhaust manifold, a retarder supply and return manifold and several interchangeable control lines formed by like-shaped control valves and components. A pilot air control assembly enables the PLC module to selectively open and close the control valves and lines to deliver or release pressurized air to the retarder.

SUMMARY

Certain embodiments according to the present disclosure generally relate to a cartridge assembly for a railroad retarder control system. The cartridge assembly includes a body having a top and a valve base and defining a bore therein. The bore has a first bore diameter and a second bore diameter that is less than the first bore diameter, the body defining pilot air passages, an upper air passage, and a lower air passage. A traveling member is positioned within the bore and has first and second traveling diameters corresponding to the first and second bore diameters of the body, respectively. The traveling member is axially moveable within the bore between an open position and a closed position via pressure differentials within the pilot air passages. The traveling member is closer to the top of the body in the open position than in the closed position. The traveling member has a base seal configured to engage with the valve base in the closed position to prevent air from flowing between the upper air passage and the lower air passage.

Another embodiment generally relates to a modular manifold system for a railroad retarder control system having a supply, a retarder, and an exhaust. The modular manifold system is configured to receive a cartridge assembly to control the flow of air through the railroad retarder control system. The modular manifold system includes a body having a left side and a right side, and defining a cavity for receiving the cartridge assembly therein. The body defines pilot air passages, an upper air passage and a lower air passage each between the left side and the right side, and a connection air passage between the upper air passage and the lower air passage. A plurality of upper air passage plugs are each installable to plug the upper air passage at one of the left side and the right side of the body. A plurality of lower air passage plugs are each installable to plug one of the lower air passages at one of the left side and the right side of the body. The body is configured to be coupled to additional like bodies to form a series of bodies such that each of the upper air passages and the lower air passages are aligned. The series of bodies is configurable to form a supply side and an exhaust side by installing one of the upper air passage plugs and one of the lower air passage plugs within the series of bodies to prevent air flow therethrough. The upper air passage and the lower air passage for one of the series of bodies in the supply side is connectable to the supply and the other to the retarder, and the upper air passage and the lower air passage for one of the series of bodies in the exhaust side is connectable to the retarder and the other to the exhaust.

Another embodiment generally relates to a railroad retarder control system having a supply, a retarder, and an exhaust. The system includes a plurality of cartridges, each of the plurality of cartridges including a body having a top and a valve base and defining a bore therein. Each bore has a first bore diameter and a second bore diameter that is less than the first bore diameter. Each body defines pilot air passages, an upper air passage, and a lower air passage. A traveling member is positioned in the bore and has first and second traveling diameters corresponding to the first and second bore diameters of the body, respectively. The traveling member is axially moveable within the bore between an open position and a closed position via pressure differentials within the pilot air passages. The traveling member is closer to the top of the body in the open position than in the closed position. The traveling member has a base seal configured to engage with the valve base in the closed position to prevent air from flowing between the upper air passage and the lower air passage. A modular manifold system is configured to receive the plurality of cartridges therein. The modular manifold system includes a series of bodies coupled together, each body in the series of bodies having a left side and a right side and each defining a bore for receiving the one of the plurality of cartridges therein. Each body further defines pilot air passages, an upper air passage and a lower air passage each between the left side and the right side, and a connection passage between the upper air passage and the lower air passage. A plurality of upper air passage plugs are each installable to plug the upper air passage for one of the series of bodies at one of the left side and the right side of the body. A plurality of lower air passage plugs are each installable to plug one of the lower air passages for one of the series of bodies at one of the left side and the right side of the body. The upper air passages and the lower air passages are aligned across the series of bodies. The series of bodies is configurable to form a supply side and an exhaust side by installing one of the upper air passage plugs and one of the lower air passage plugs within the series of bodies to prevent air flow therethrough. The upper air passage and the lower air passage for a supply side body among the series of bodies in the supply side is connectable to the supply and the other to the retarder, and the upper air passage and the lower air passage for an exhaust side body among the series of bodies in the exhaust side is connectable to the retarder and the other to the exhaust.

BRIEF DESCRIPTION OF THE DRAWINGS

The drawings illustrate embodiments for carrying out the disclosure. The same numbers are used throughout the drawings to reference like features and like components. In the drawings:

FIGS. 7A-9C provide further schematic views of another embodiment of a modular manifold system according to the present disclosure;

DETAILED DISCLOSURE

This written description uses examples to disclose embodiments of the present application and also to enable any person skilled in the art to practice or make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

FIGS. 1A-1D depict a prior art cartridge assembly 101 used in conjunction with a railroad retarder control system as known in the art. Additional information regarding cartridge assemblies known in the art is provided in U.S. Pat. Nos. 9,732,876 and 9,964,230, for example, which are incorporated by reference herein. The prior art cartridge assembly 101 is comprised of a body 110 that defines a bore 120 within the top 116 for receiving a traveling member 180 therein. The traveling member 180 comprises a piston 200, piston guide 210, and base seal 190.

The bore 120 has a first bore diameter 122 and a second bore diameter 124, which correspond to a first traveling diameter 182 and a second traveling diameter 184 of the traveling member 180, respectively. The traveling member 180 is axially movable within the bore 120 between an open position shown in FIG. 1C and a closed position shown in FIG. 1B. For the prior art cartridge assembly 101 shown, the traveling member 180 is closer to the top 116 of the body 110 in the closed position than in the open position. The base seal 190 of the traveling member 180 is configured to engage with a valve base 118 within the body 110 when the traveling member 180 is in the closed position. In this manner, the base seal 190 prevents air from flowing between an upper air passage 140 and a lower air passage 150 of a prior art manifold 301 (see FIG. 3) by sealing off a connection air passage 160 therebetween, as will be discussed herein below.

Figure 1A:
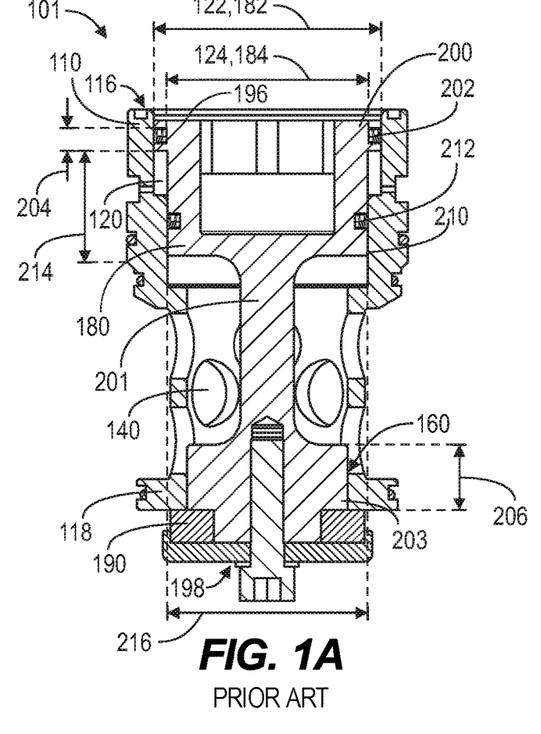
FIG. 1A is a sectional side view of a prior art cartridge assembly used in a railroad retarder control system.
Figure 1B:
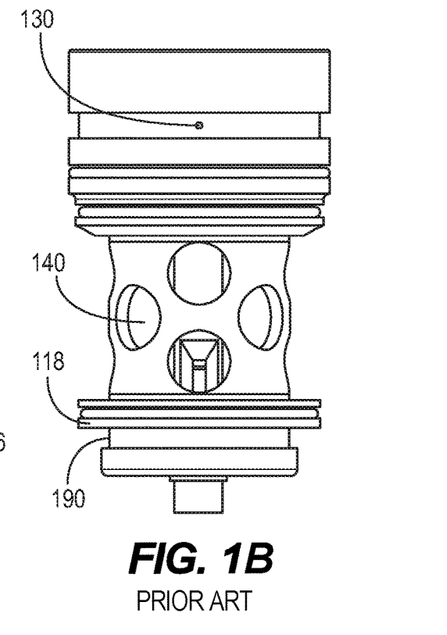
FIGS. 1B and 1C are side views of the prior art cartridge of FIG. 1A in the closed and open positions, respectively.
Figure 1C:
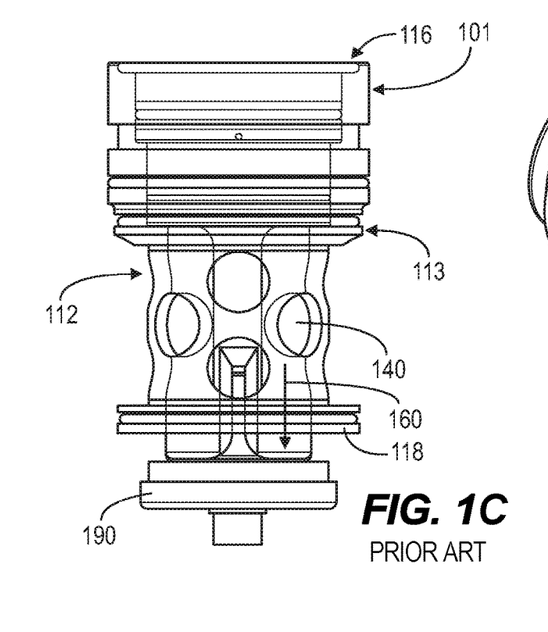
Figure 1D:
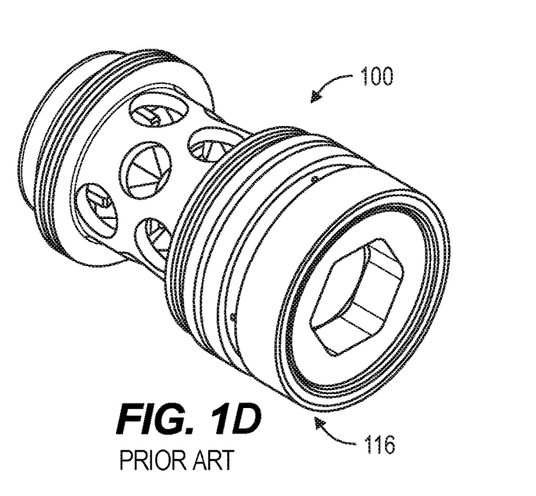
FIG. 1D is an isometric view of the top of the prior art cartridge of FIG. 1A.

As shown in FIGS. 1A-1D and 3, axial movement of the traveling member is controlled via pressure differentials within pilot air passages 130 (FIG. 1B). In particular, when pilot pressure is provided below the piston 200 of the traveling member 180, the traveling member 180 is generally caused to move in the upward direction towards the closed position of FIG. 1B. In contrast, pilot air pressure provided downwardly on the top 196 of the traveling member 180 generally causes downward movement of the traveling member 180 towards the open position of FIG. 1C. The pilot air pressure may be controlled in a manner known in the art.

In the embodiment shown in FIG. 1A, the prior art cartridge 101 and specifically the axial movement of the piston 200 therein is supported by the piston guide 210 through engagement with the bore 120. The piston guide 210 has a piston guide diameter 216 that, along with the piston guide seals 212, generally matches with the second bore diameter 124 to prevent skewing. Movement of the piston 200 controls the position of the base seal 190 via a spool 201 coupled between the piston guide 210 and the base seal 190. In this manner, air is allowed to flow between the upper air passage 140 and the lower air passage 150 (see FIG. 3) through the connection air passage 160 due to the spool 201 having a smaller diameter than the bore 120 within the connection air passage 160.

Through experimentation and development, the present inventors have identified that prior art cartridges 101 have issues with accuracy and durability, requiring a larger size and heavier materials to overcome these challenges. As demonstrated in FIG. 1A, the relatively small length 204 of the piston 200, length 214 of the piston guide 210, and support length 206 of the guide vanes 203 engaging with the bore 120 allows skew, or non-axial movement of the traveling member 180 between the open position and closed position. This in turn causes damage to components over time, creates additional noise, and requires over-engineering of components to accommodate these challenges. For example, the present inventors have identified excessive wear and tear on the piston guide 210 using prior art cartridges 101 presently known.

Figure 2A:
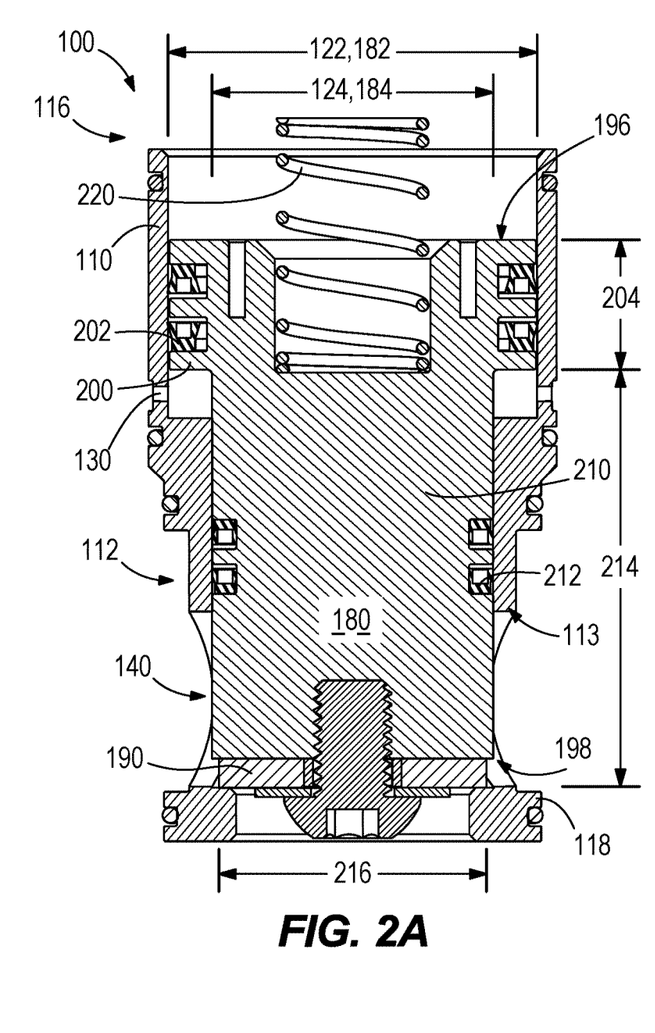
FIG. 2A is a sectional side view of a cartridge assembly according to the present disclosure.
Figure 2B:
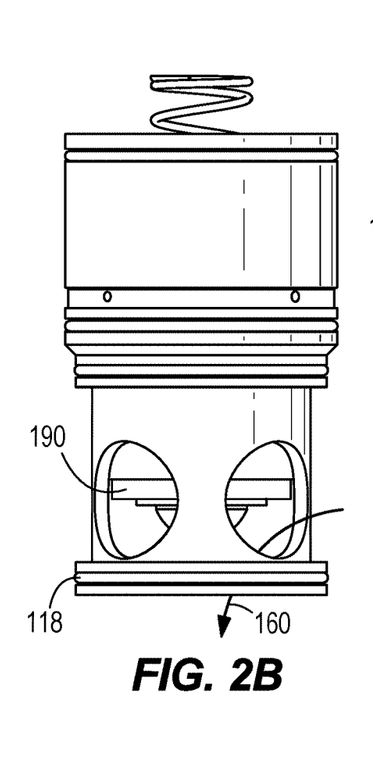
FIGS. 2B and 2C are side views of the cartridge assembly of FIG. 2A in the open and closed positions, respectively.
Figure 2C:
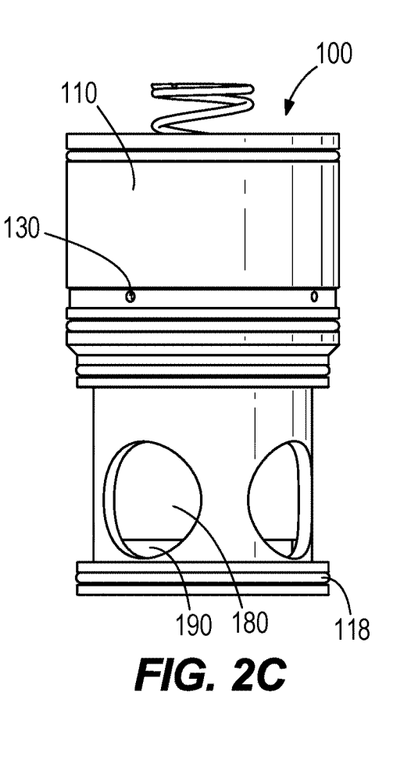

FIGS. 2A-2C depict a cartridge assembly 100 according to the present disclosure. The cartridge assembly 100 includes a body 110 having sides, a top 116, and a valve base 118. The body 110 defines a bore 120 therein, which has a first bore diameter 122 and a second bore diameter 124. A traveling member 180 having a piston 200, piston guide 210, and base seal 190 is receivable within the bore 120. A first traveling diameter 182 and a second traveling diameter 184 of the traveling member correspond to the first bore diameter 122 and the second bore diameter 124 of the bore 120, respectively. In particular, a combination of the piston guide 210 and piston guide seals 212 define the second traveling diameter 184, which generally matches the second bore diameter 124 subject to tolerances, lubrication clearances, and the like. Likewise, the combination of the piston 200 and piston seals 202 define the first traveling diameter 182, which matches the first bore diameter 122, subject to tolerances and the like.

As with cartridge assemblies known in the art, the cartridge assembly 100 is axially movable between an open position and a closed position, shown in FIGS. 2B and 2C, respectively. In contrast to the prior art cartridge 101 previously discussed, the cartridge assembly 100 is configured such that the traveling member 180 is closer to the top 116 of the body 110 in the open position than in the closed position. In other words, the traveling member 180 for the embodiment of cartridge assembly 100 shown in FIGS. 2A-2C moves upwardly to open and downwardly to close, which is opposite the prior art.

Figure 5:
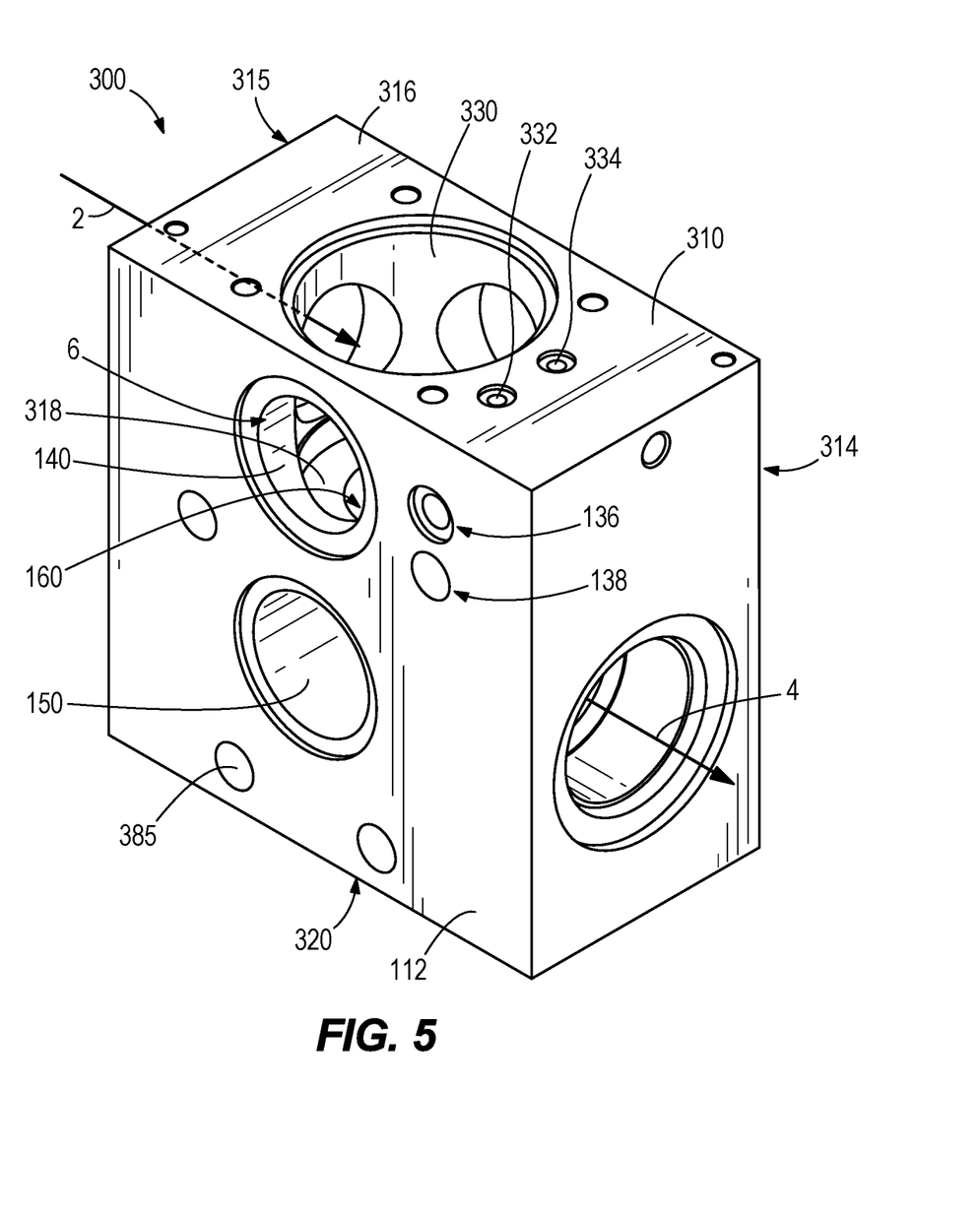
FIG. 5 is an isometric view of a single body for a modular manifold system according to the present disclosure.

In the closed position, the base seal 190 coupled to the piston guide 210 engages with the valve base 118 of the body 110 to prevent air from flowing between an upper air passage 140 and a lower air passage 150 of a modular manifold system 300 (see FIG. 5) via a connection air passage 160 therebetween, as discussed further herein below. In contrast to the prior art cartridge 101 previously discussed, the piston guide 210 (FIG. 2A) extends down to the bottom 198 of the traveling member 180 to be coupled to the base seal 190 of the piston 200. In other words, the cartridge assembly 100 presently shown does not include a spool.

The longer length 214 of the piston guide 210 compared to prior art cartridge assemblies 101 (as well as a longer length 204 of the piston 200) provides additional support of the traveling member 180 during axial movement within the bore 120, resulting in better stability and durability. Coupling the piston guide 210 to the base seal 190 is enabled by the cartridge assembly 100 being configured to be in the open position by moving the traveling member 180 upwardly towards the top 116 of the body 110, rather than downwardly as with the prior art cartridge 101. In other words, a spool is not required to allow the air to flow between the upper air passage 140 and the lower air passage 150 via the connection air passage 160 (FIG. 5) since the traveling member 180 is moved upwardly, out of the connection air passage 160.

While certain embodiments of the presently disclosed cartridge assembly 100 benefit from not having a spool, other embodiments incorporating a spool are also anticipated herein. In certain embodiments, a spool is defined as being a portion of the traveling member that is at least 20% of the length 214 of the piston guide 210 and has a piston guide diameter 216 that is less than 75% of the second bore diameter 124. However, other definitions of a spool would also be known in the art.

The cartridge assembly 100 shown in FIGS. 2A-2C further incorporates a biasing device 220 between a cover 117 (FIG. 6) coupling the cartridge assembly 100 to the body 110, and the top 196 of the traveling member 180 for biasing the traveling member 180 into the closed position. In the embodiment shown, the biasing device 220 is a compression spring. However, other biasing devices, including leaf springs, for example, are also anticipated. This configuration is in contrast to the prior art cartridge 101 shown in FIG. 1A, which requires pilot air pressure to be applied downwardly on the top 196 of the traveling member 180 to move the traveling member 180 downwardly. With the cartridge assembly 100 of the present disclosure, the force from the biasing device 220 is selectively overcome by providing a greater force via pilot air pressure introduced below the piston 200, which forces the traveling member 180 upwardly against the biasing device 220. In this manner, movement of the cartridge assembly 100 between the closed position shown in FIG. 2C and the open position shown in FIG. 2B can be controlled by modulation of the pilot air introduced via the pilot air passages 130.

In addition to simplifying the design, the present inventors have identified that the use of the biasing device 220 provides a failsafe by which the cartridge assembly 100 is automatically positioned in the closed position in the event of a failure to provide pilot air pressure.

Figure 3:
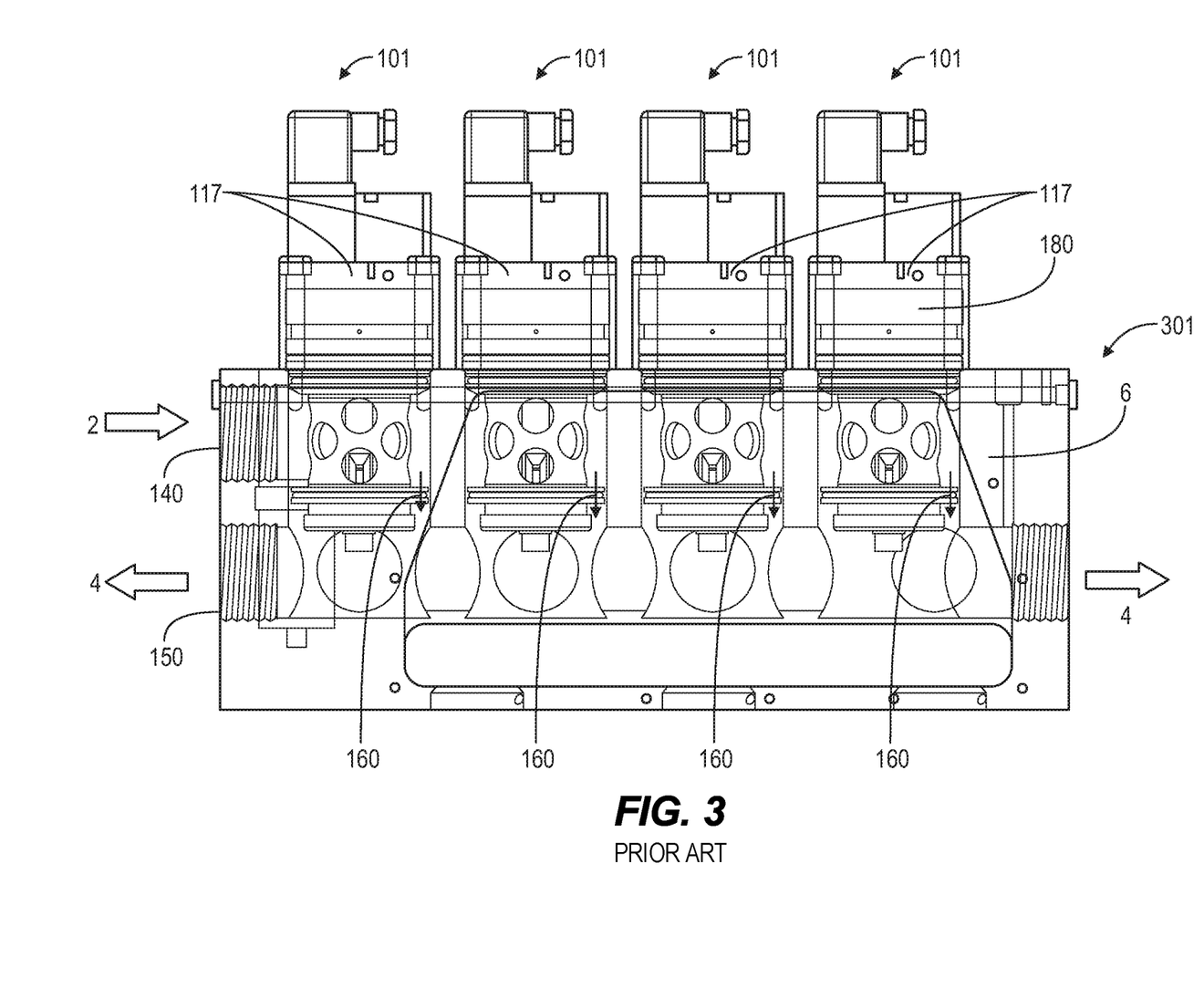
FIG. 3 depicts a prior art manifold used in a railway retarder control system, integrating the cartridge assemblies of 1A.
Figure 4:
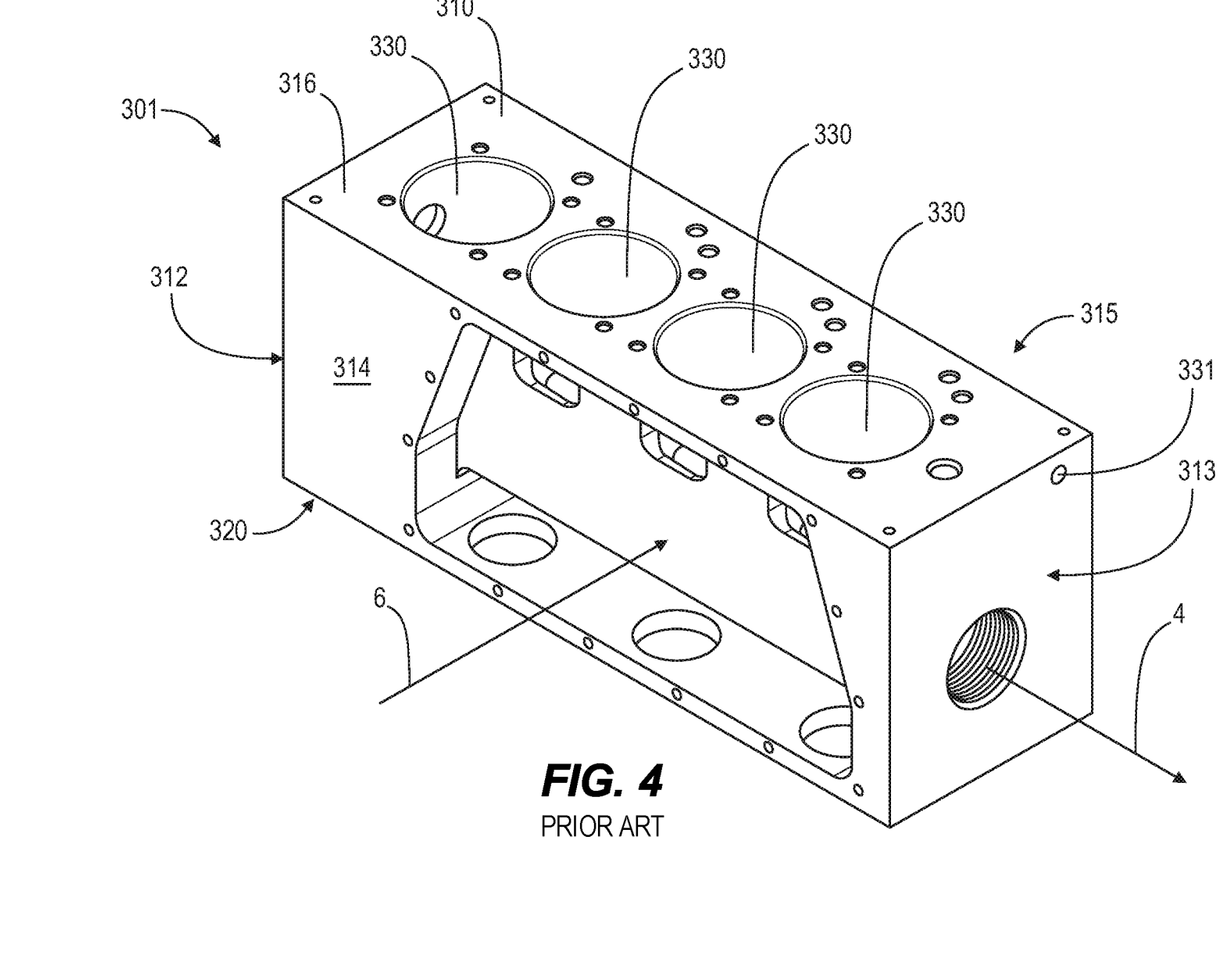
FIG. 4 is an isometric view of the body of the prior art manifold of FIG. 3 with the cartridge assemblies and other components removed.
Figure 6:
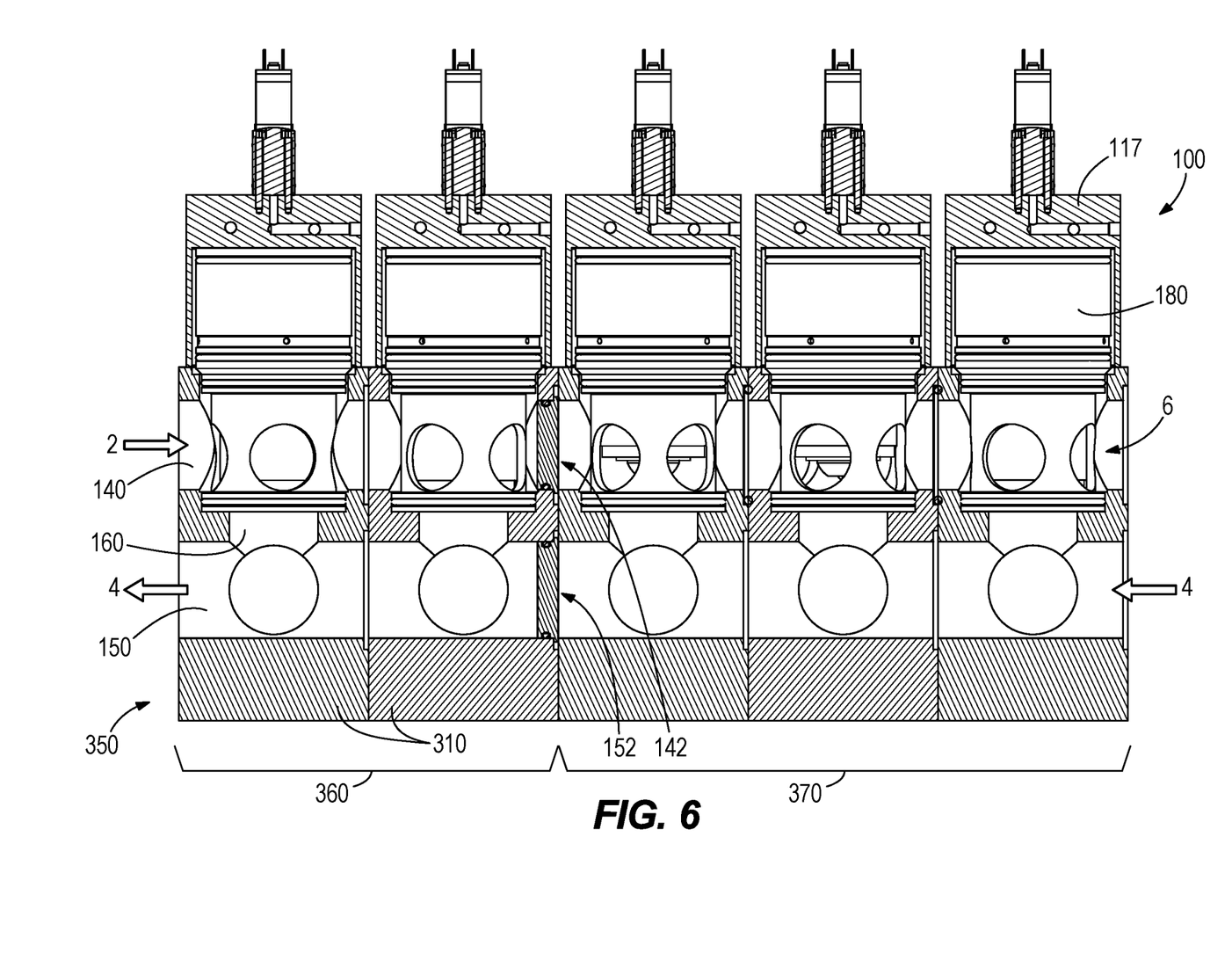
FIG. 6 is a sectional side view of a modular manifold system comprised of five bodies as shown in FIG. 5, also incorporating the cartridge assemblies of FIG. 2A.
Figure 7A:
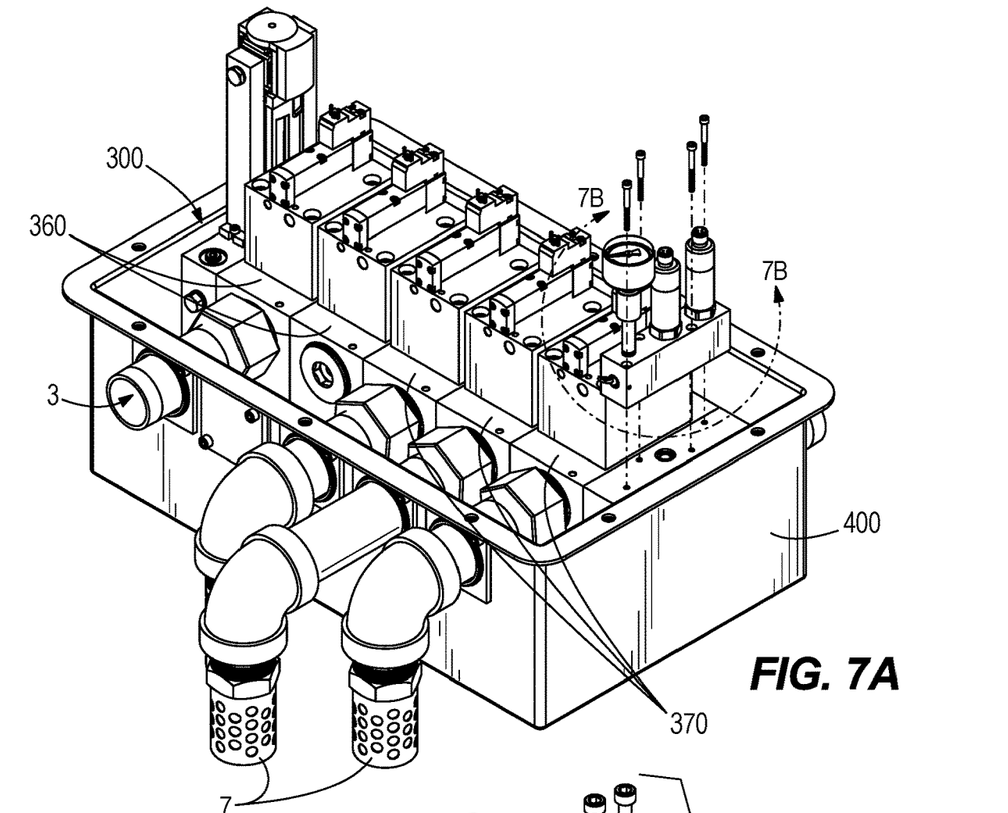
Figure 7B:
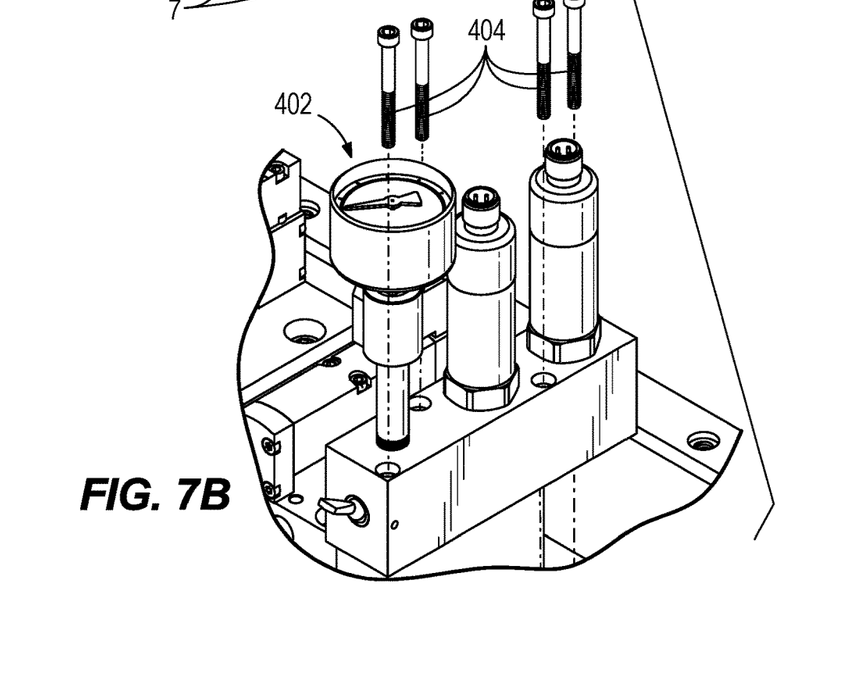

Now transitioning to manifolds, FIGS. 3 and 4 depict a prior art manifold 301 used within a railroad retarder control system as known in the art, which incorporates the prior art cartridges 101 previously discussed therein. The prior art manifold 301 has a supply port 2, retarder port 4, and exhaust port 6, and also defines cavities 330 for receiving the prior art cartridges 101. The body 310 of the prior art manifold 301 has a left side 312 and a right side 313, a top 316 and a bottom 320, a front 314 and a back 315. The body 310 further defines pilot air passages 331 for providing pilot air pressure to the traveling member 180 to cause axial movement thereof.

As stated above, the prior art manifold 301 defines cavities 330 for receiving the prior art cartridges 101, which are coupled thereto by the incorporation of covers 117 (similar to those of FIG. 6). As best shown in FIG. 3, the prior art manifold 301 defines an upper air passage 140 that communicates with a lower air passage 150 via connection air passages 160 therebetween. Each of the prior art cartridges 101 controls the flow between the upper air passage 140 and the lower air passage 150 in the manner previously discussed. As shown, the left-most of the upper air passage 140 includes a supply port 2 for connecting to a supply line of air pressure for the railroad retarder control system. The lower air passage 150 is common across all cavities 330 such that it is defined through the entirety of the prior art manifold 301. Both the left and right ends of the lower air passage 150 are provided with retarder ports 400 configured to be coupled to a retarder known in the art.

In this manner, air is introduced into the prior art manifold 301 by opening the left-most prior art cartridge 101 to allow air in from the air supply port 2, which flows from the upper air passage 140 into the lower air passage 150 via the connection air passage 160 depending upon the states of the prior art cartridges 101. Since the lower air passage 150 is common across all cavities in the prior art manifold 301, the air from the supply port 2 entering the lower air passage 150 is either exhausted by opening one or more of the other prior art cartridges 101 coupled to an exhaust port 6, and/or delivered to one or more retarders via retarder ports 4. In other words, air is supplied to the retarders via the retarder ports 4 by opening the left-most prior art cartridge 101, and closing the remaining prior art cartridges 101 to prevent the air from exhausting from the prior art manifold 301. Air may be statically retained within the prior art manifold 301 by closing all prior art cartridges 101. Finally, air may be exhausted from the prior art manifold 301 by leaving the left-most prior art cartridge 101 closed to prevent additional supply from entering through the supply port 2, but opening one or more of the remaining prior art cartridges 101 coupled to the exhaust via exhaust port 6 such that air flows from the lower air passage 150, as well as from any retarders coupled via retarder ports 4, to the exhaust ports 6 via the open prior art cartridges 101.

The present inventors have identified issues with the flexibility, serviceability, performance, and durability of these prior art manifolds 301. For example, the single-piece or otherwise fixed construction of the body 310 is non-configurable, whereby the cavities 330 shown in FIGS. 3 and 4 are configured so as to provide specifically one inlet and three exhausts. Furthermore, the body 310 is fixed with respect to having four cavities 330 total, whereas particular needs may dictate a configuration having fewer cavities, such as one inlet and one exhaust, or additional cavities 330 such as for two inlets and four exhausts, for example. In these circumstances, different bodies 310 must be produced specifically for each desired configuration or need, requiring extensive inventory, manufacturing molds, castings, and the like, and/or increased delivery time to fulfill an order. The prior art manifolds 301 and prior art cartridge assemblies 101 also do not permit servicing or replacement of traveling member 180 from above. Instead, the entire prior art cartridge 101 must be removed from the prior art manifold 301.

FIGS. 5-10B show a modular manifold system 300 according to the present disclosure. The modular manifold system 300 is comprised of individual, modular bodies 310 configured to be coupled together to produce an overall modular manifold system 300 of the desired characteristics. The modular manifold system 300 is configurable to have one or more of supply ports 2, retarder ports 4, and exhaust ports 6 similar to prior art manifolds 301. The modular manifold system 300 is configured to receive a cartridge assembly 100, such as that shown in FIGS. 2A-2C, to control the flow of air through the railroad retarder control system. In particular, the modular manifold system 300 includes a body 310 having a left side 312, right side 313, front side 314 and back side 315, and top 316 and bottom 320, and further defines a cavity 330 for receiving the cartridge assembly 100 therein. The body 310 further defines pilot air passages, which include pilot air inlets 332 and pilot air exhausts 334, an upper air passage 140 between the left side 312 and the right side 313, and a lower air passage 150 between the left side 312 and the right side 313. A connection air passage 160 is defined between the upper air passage 140 and the lower air passage 150. As shown in FIG. 6, the modular manifold system 300 further includes upper air passage plugs 142 and lower air passage plugs 152 that are each installable within the upper air passage 140 and lower air passage 150, respectively, to prevent to the flow of air therethrough. In particular, each of the upper air passage plugs 142 and lower air passage plugs 152 are installable within the left side 312 or right side 313 of the upper air passage 140 or lower air passage 150.

The modular manifold system 300 and each body 310 thereof is configured to be coupled with additional like bodies 310 to form a series of bodies 350 in which each of the upper air passages 140 and each of the lower air passages 150 is aligned across the series of bodies 350. Each body 310 is configurable such that a supply side 360 and an exhaust side 370 are defined within the series of bodies 350, specifically by installing one of the upper air passage plugs 142 and one of the lower air passage plugs 152 within the series of bodies 350 to prevent airflow therethrough. A common supply pilot air passage 136 and common exhaust pilot air passage 138 is also formed across the series of bodies 350 for the pilot air passages.

In certain embodiments, the upper air passage plugs 142 and lower air passage plugs 152 are provided together, such as in the form of a single plate, such as the end plate 380 shown in FIGS. 8A-8B (discussed below). In further embodiments, the end plate 380 is modified to be solid within the region that would otherwise communicate with the upper air passage 140 and lower air passage 150 of an adjacent body 310. It should be recognized that, in this manner, the single plate would block the flow of air between the supply side 360 and the exhaust side 370 of a series of bodies 350 in the same manner as installing individual upper air passage plugs 142 and lower air passage plugs 152.

In the embodiment shown in FIG. 6, the upper air passage 140 on the supply side 360 is connected to a supply port 2 for receiving air supply to the modular manifold system 300 to control the railroad retarder in the customary manner. Likewise, the lower air passage 150 is coupled to a one or more retarder ports 4 for coupling to retarders in the manner known in the art. An upper air passage plug 142 and a lower air passage plug 152 are shown separating or blocking the respective upper air passages 140 and lower air passages 150 between the supply side 360 and the exhaust side 370, which in the present embodiment are engaged via press fit in one or both of the right side 313 of the upper air passage 140 on the supply side 360, and/or the left side 312 of the upper air passage 140 of the exhaust side 370, and similarly for the lower air passage 150.

On the exhaust side 370, the upper air passage 140 is connected to an exhaust port 6, and the lower air passage 150 is connected to a retarder port 4 configured to be coupled to the retarders in the customary manner. It should be recognized that the supply port 2, retarder port 4, and/or exhaust port 6 may be alternatively coupled in the opposite of the upper air passage 140 and lower air passage 150 previously discussed. In this manner, the cartridge assembly 100 controls the flow of air between the upper air passage 140 and the lower air passage 150 on the supply side 360 and the exhaust side 370 to selectively control the flow of air between the supply port 2, retarder port 4, and the exhaust port 6.

It should be recognized that the modular manifold system 300 presently disclosed allows full customization to include any number of bodies 310 therein, and further to customize the number of bodies 310 on the supply side 360, as well as on the exhaust side 370. In certain embodiments, each of the bodies 310 may be identical and configurable as either a supply side 360 or exhaust side 370 component through the corresponding use of upper air passage plugs 142 and lower air passage plugs 152.

FIGS. 7A-9C depict an exemplary modular manifold system 300 having five bodies 310 within the series of bodies 350, which is incorporated within a box 400 as known in the art. In the embodiment shown, the modular manifold system 300 further incorporates pressure sensors 402 couplable via fasteners 404, which provide further information regarding the pilot air pressure and/or supply, retarder, or exhaust pressure within the modular manifold system 300.

Figures 8A, 8B, 8C, 8D, 8E:
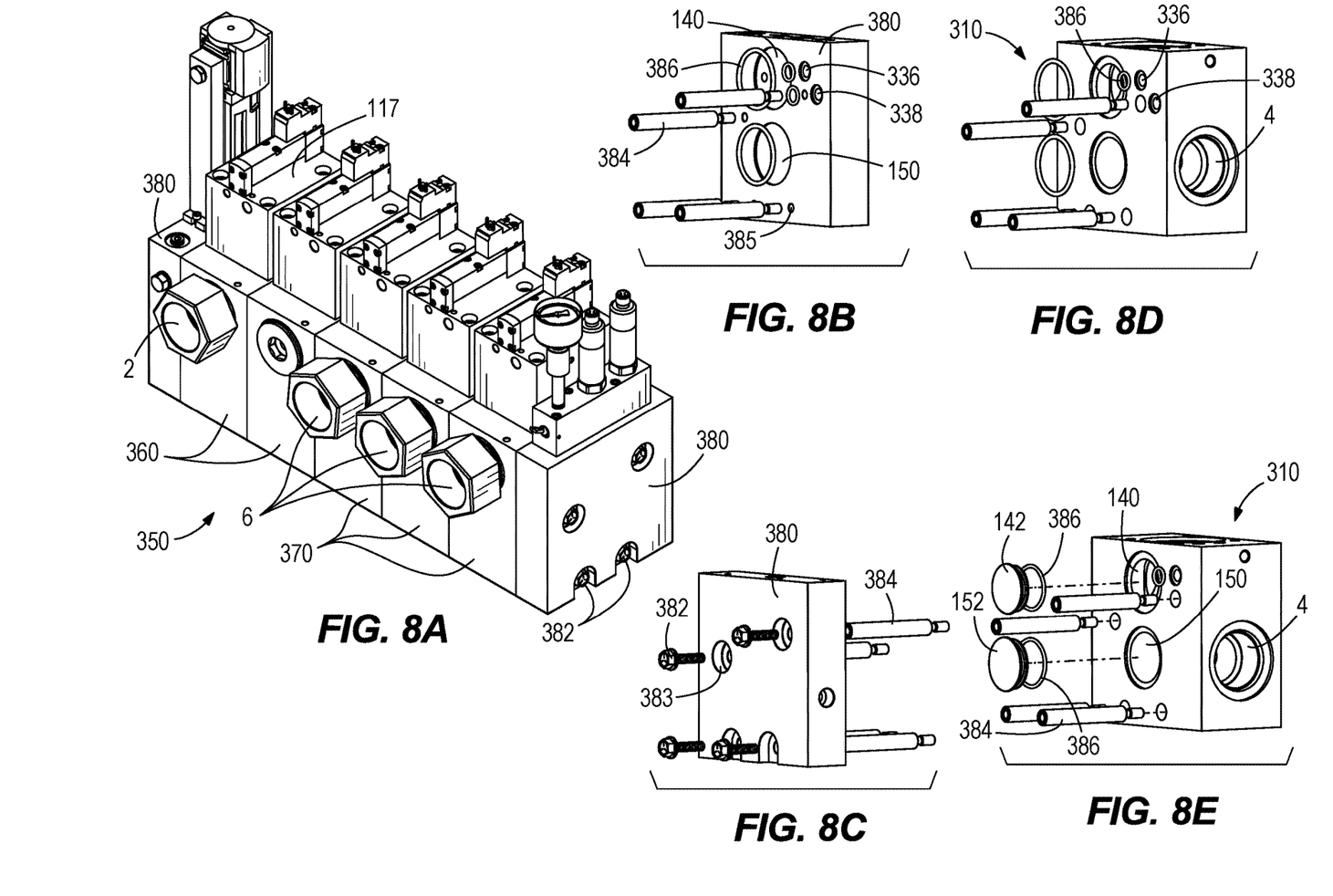
Figure 9A:
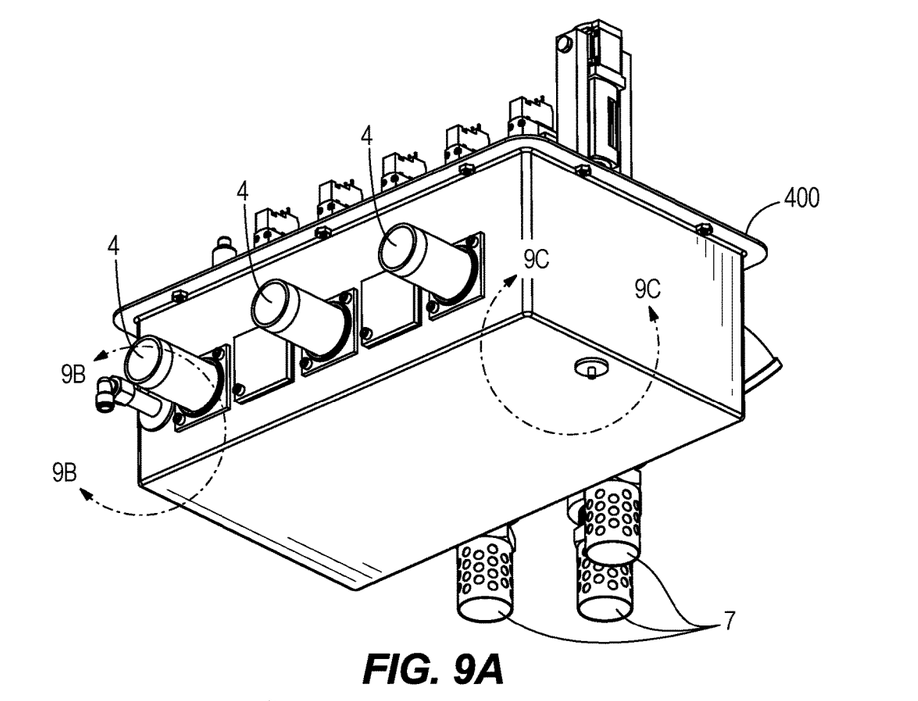
Figure 9B:
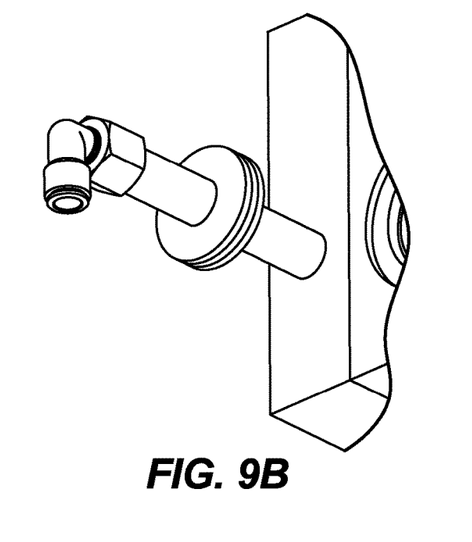
Figure 9C:
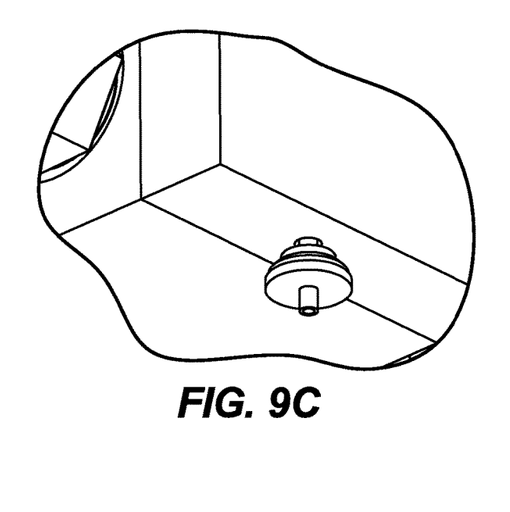

FIGS. 8A-8E provide further detail for combining bodies 310 to form a modular manifold system 300, particularly through the incorporation of end plates 380. In the embodiment shown, an end plate 380 is couplable on the left-most side of the supply side 360 in the series of bodies 350 shown in FIG. 8A, which further defines a point for supplying and exhausting the common supply pilot air passages 336 and common exhaust pilot air passages 338, respectively (FIG. 8B). The end plate 380 of FIG. 8B is then coupled via tie rods 384 and fasteners 382 extending through holes 385 to another end plate 380 on the opposite side of the series of bodies 350 on the exhaust side 370. Gaskets 386 are also incorporated to prevent the escape of air through the upper air passage 140, the lower air passage 150, and/or either of the common supply pilot air passage 336 and common exhaust pilot air passage 338 between the body 310 and the end plate 380. Gaskets 386 are also provided between bodies 310.

FIGS. 8D-8E further depict the bodies 310 in conjunction with the tie rods 384 and gaskets 386 used to couple the bodies 310 to form the series of bodies 350. As previously discussed, each body 310 includes a common supply pilot air passage 336, as well as a common exhaust pilot air passage 338, with corresponding gaskets 386 to provide a seal with an adjacent body 310. In addition to the gaskets 386 also provided for the upper air passage 140 and lower air passage 150, FIG. 8E further depicts the incorporation of upper air passage plugs 142 and lower air passage plugs 152 to prevent the flow of air from the upper air passage 140 and the lower air passage 150 between adjacent bodies 310, such as to separate a supply side 360 and an exhaust side 370 within a series of bodies 350. The bodies 310 of FIGS. 8D-8E further show the incorporation of a retarder port 4, which may be coupled to a retarder in the manner known in the art. It should further be recognized that the retarder port 4, as well as supply ports 2 and exhaust parts 6, may also be plugged with a plug similar to the upper air passage plug 142 or the lower air passage plug 152 (which may themselves be interchangeable) to provide customization of all ports throughout the modular manifold system 300.

Figure 10A:
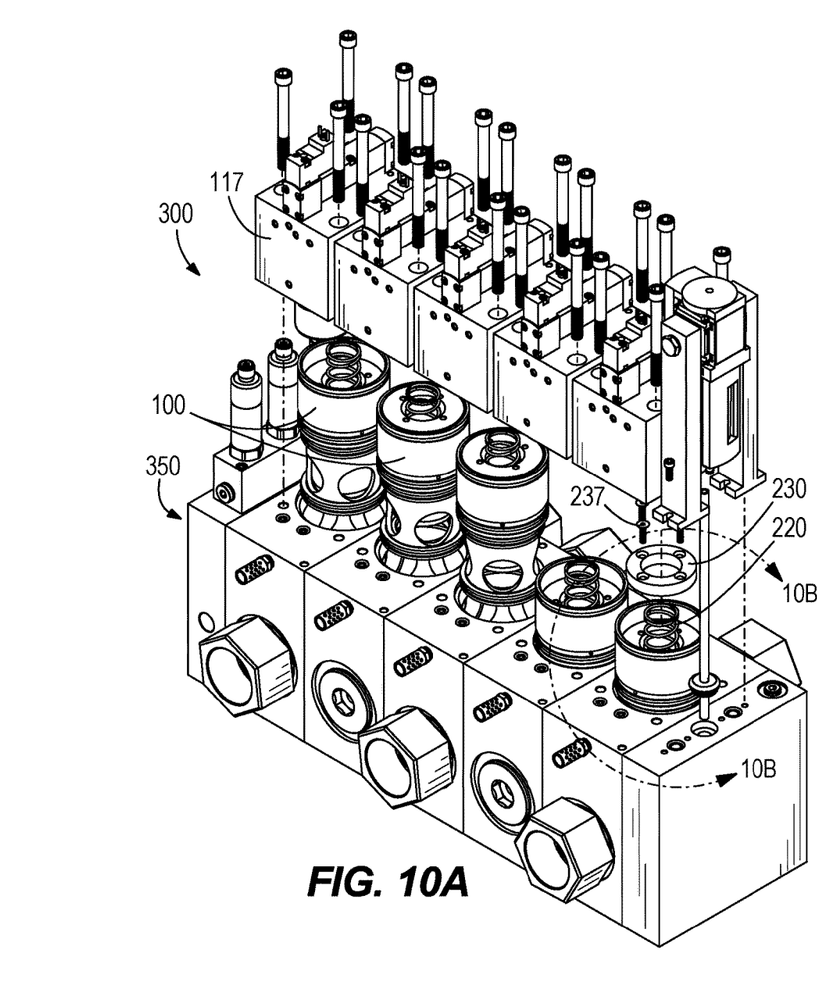
FIGS. 10A and 10B further depict an embodiment of cartridge assembly incorporating a restrictor plate for limiting travel within the cartridge assembly (such as that shown in FIG. 2A), incorporated within a modular manifold system such as shown in FIG. 6.
Figure 10B:
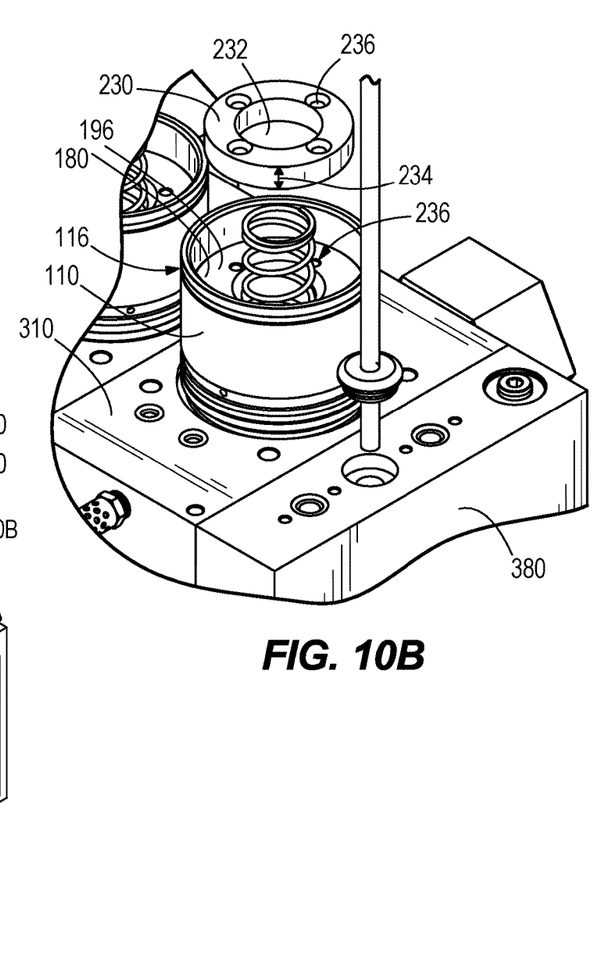

As shown in FIGS. 10A-10B, the present disclosure further depicts the incorporation of a restrictor plate 230 to provide customization of the stroke length of a given cartridge assembly 100, such as was previously discussed with respect to FIGS. 2A-2C. In particular, the restrictor plate 230 is positionable between the top 196 of the traveling member 180 of the cartridge assembly 100 and the cover 117 coupled above the cartridge assembly 100 so as to limit the upward stroke available for axial movement of the traveling member 180. In the embodiment shown, the restrictor plate 230 has a height 234, which directly corresponds to the reduction or limitation of the stroke for the traveling member 180. In this manner, a cartridge assembly 100 may be fully customized in the field simply by the selection of the restrictor plate 230, or the removal of the restrictor plate 230 altogether.

In the embodiment shown, the restrictor plate 230 defines an opening 232 therein such that the biasing device 220 is unobstructed and continues to extend between the top 196 of the traveling member 180 and the cover 117. The present embodiment further discloses the incorporation of coupler openings 236 defined within the restrictor plate 230 such that the restrictor plate 230 may be fixed to the top 196 of the traveling member 180 (or the cover 117), rather than floating therein. It should be recognized that the restrictor plate 230 may be coupled to the top 196 of the traveling member 180 through bolts, screws, adhesives, or other methods presently known in the art.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

We claim:

1. A cartridge assembly for a railroad retarder control system, the cartridge assembly comprising:
    a body having a top and a valve base and defining a bore therein, the bore having a first bore diameter and a second bore diameter that is less than the first bore diameter, the body defining pilot air passages, an upper air passage, and a lower air passage; and
    a traveling member positioned within the bore and having first and second traveling diameters corresponding to the first and second bore diameters of the body, respectively, wherein the traveling member is axially moveable within the bore between an open position and a closed position via pressure differentials within the pilot air passages;
    wherein the traveling member is closer to the top of the body in the open position than in the closed position; and
    wherein the traveling member has a base seal configured to engage with the valve base in the closed position to prevent air from flowing between the upper air passage and the lower air passage.

2. The cartridge assembly according to claim 1, wherein the traveling member comprises a piston and piston seals that sealingly contacts the piston and the bore within the first bore diameter, and wherein the traveling member further comprises a piston guide and piston guide seals that sealingly contacts the piston guide and the bore within the second bore diameter.

3. The cartridge assembly according to claim 2, wherein providing pressure via the pilot air passages causes the traveling member to move towards the top of the body.

4. The cartridge assembly according to claim 3, further comprising a biasing device that biases the traveling member towards the valve base.

5. The cartridge assembly according to claim 4, wherein the biasing device is a compression spring.

6. The cartridge assembly according to claim 2, wherein the piston is coupled to the base seal by the piston guide, wherein the piston guide has a length and a piston guide diameter, and wherein at least 20% of the length of the piston guide has a piston guide diameter that is at least 75% of the second bore diameter.

7. The cartridge assembly according to claim 1, further comprising a restrictor plate positioned between the traveling member and the top of the body so as to limit the axial movement of the traveling member towards the top of the body.

8. The cartridge assembly according to claim 1, wherein the traveling member is removable from the bore only out the top of the body.

9. The cartridge assembly according to claim 1, wherein the valve base is farther than the base seal from the top of the body both when the traveling member is in the open position and in the closed position.

10. A modular manifold system for a railroad retarder control system having a supply, a retarder, and an exhaust, the modular manifold system being configured to receive a cartridge assembly to control the flow of air through the railroad retarder control system, the modular manifold system comprising:
    a body having a left side and a right side, and defining a cavity for receiving the cartridge assembly therein, wherein the body defines pilot air passages, an upper air passage and a lower air passage each between the left side and the right side, and a connection air passage between the upper air passage and the lower air passage;
    a plurality of upper air passage plugs installable to plug the upper air passage at one of the left side and the right side of the body; and
    a plurality of lower air passage plugs installable to plug one of the lower air passages at one of the left side and the right side of the body;
    wherein the body is configured to be coupled to additional like bodies to form a series of bodies such that each of the upper air passages and the lower air passages are aligned, wherein the series of bodies is configurable to form a supply side and an exhaust side by installing one of the upper air passage plugs and one of the lower air passage plugs within the series of bodies to prevent air flow therethrough, wherein the upper air passage and the lower air passage for one of the series of bodies in the supply side is connectable to the supply and the other to the retarder, and wherein the upper air passage and the lower air passage for one of the series of bodies in the exhaust side is connectable to the retarder and the other to the exhaust.

11. The modular manifold system according to claim 10, wherein the body is further configured such that when coupled to the additional like bodies the pilot air passages are also aligned to form common pilot passages.

12. The modular manifold system according to claim 11, wherein the common pilot passages comprise a common supply pilot air passage and a common exhaust pilot air passage.

13. The modular manifold system according to claim 10, wherein the series of bodies has two bodies on the supply side and three bodies on the exhaust side.

14. A railroad retarder control system having a supply, a retarder, and an exhaust, the system comprising:
    a plurality of cartridges, each of the plurality of cartridges comprising:
    a body having a top and a valve base and defining a bore therein, the bore having a first bore diameter and a second bore diameter that is less than the first bore diameter, the body defining pilot air passages, an upper air passage, and a lower air passage; and
    a traveling member positioned in the bore and having first and second traveling diameters corresponding to the first and second bore diameters of the body, respectively, wherein the traveling member is axially moveable within the bore between an open position and a closed position via pressure differentials within the pilot air passages;
    wherein the traveling member is closer to the top of the body in the open position than in the closed position; and
    wherein the traveling member has a base seal configured to engage with the valve base in the closed position to prevent air from flowing between the upper air passage and the lower air passage; and
    a modular manifold system configured to receive the plurality of cartridges therein, the modular manifold system comprising:
    a series of bodies coupled together, each body in the series of bodies having a left side and a right side and each defining a bore for receiving the one of the plurality of cartridges therein, wherein each body further defines pilot air passages, an upper air passage and a lower air passage each between the left side and the right side, and a connection passage between the upper air passage and the lower air passage;

a plurality of upper air passage plugs installable to plug the upper air passage for one of the series of bodies at one of the left side and the right side of the body; and a plurality of lower air passage plugs installable to plug one of the lower air passages for one of the series of bodies at one of the left side and the right side of the body;

wherein the upper air passages and the lower air passages are aligned across the series of bodies, wherein the series of bodies is configurable to form a supply side and an exhaust side by installing one of the upper air passage plugs and one of the lower air passage plugs within the series of bodies to prevent air flow therethrough, wherein the upper air passage and the lower air passage for a supply side body among the series of bodies in the supply side is connectable to the supply and the other to the retarder, and wherein the upper air passage and the lower air passage for an exhaust side body among the series of bodies in the exhaust side is connectable to the retarder and the other to the exhaust.

15. The system assembly according to claim 14, wherein the pilot air passages are defined within the body to be between the first traveling diameter of the traveling member and the valve base, and wherein providing pressure via the pilot air passages moves the traveling member towards the top of the body.

16. The system according to claim 14, wherein the pilot air passages within the series of bodies are aligned to form a common pilot passage.

17. The system according to claim 16, wherein the common pilot passage comprises a common pilot supply passage and a common pilot exhaust passage.

18. The system according to claim 14, wherein the traveling member for one of the plurality of cartridges is removable while the body of the one of the plurality of cartridges remains within modular manifold system.

19. The system according to claim 14, wherein each of the plurality of cartridges further comprises a biasing device that biases the traveling member towards the valve base.

20. The system according to claim 14, wherein at least one of the plurality of cartridges further comprises a restrictor plate positioned between the top of the body and the traveling member so as to limit the axial movement of the traveling member towards the top of the body.

* * * * *